United States Patent Office 3,241,374
Patented Mar. 22, 1966

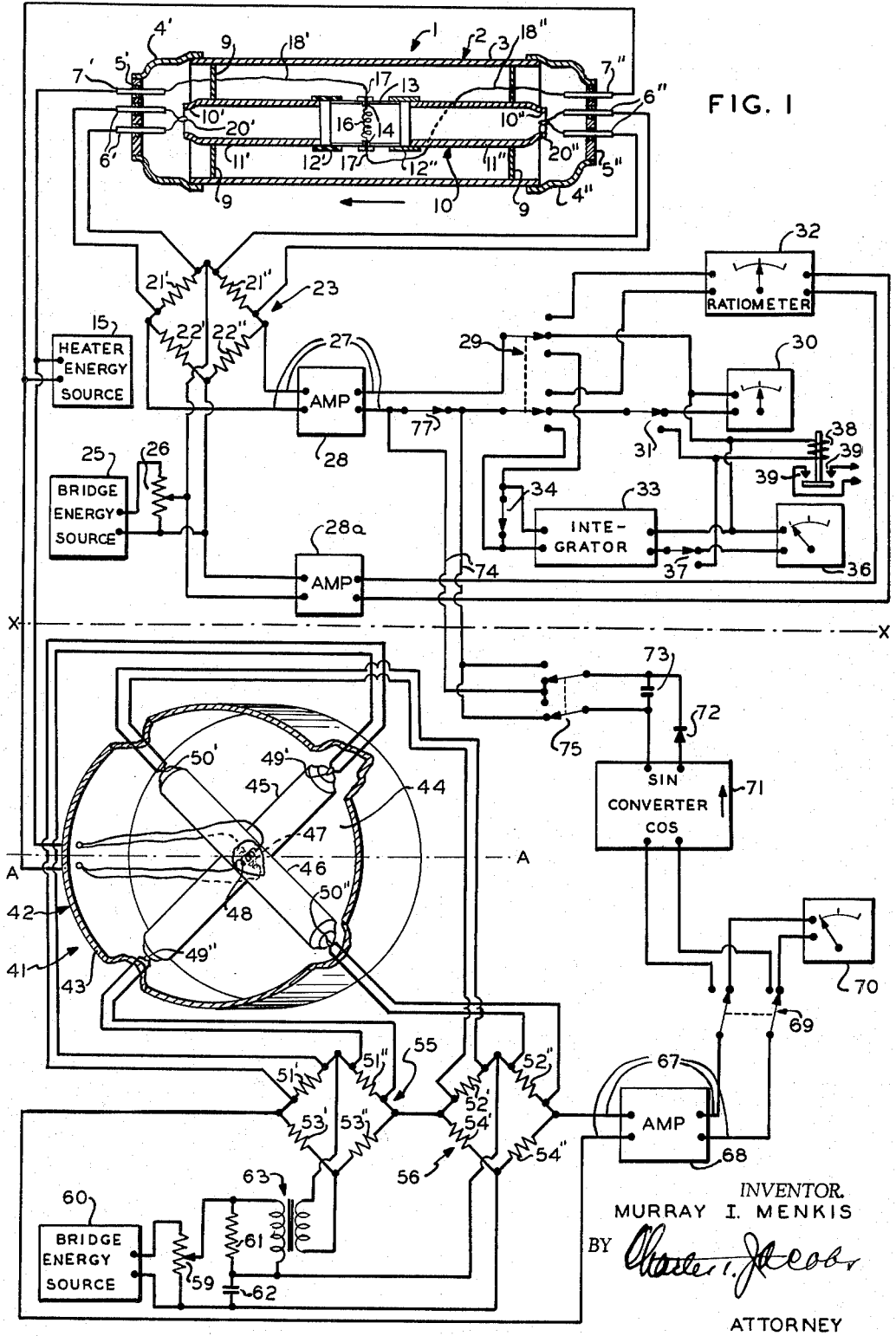

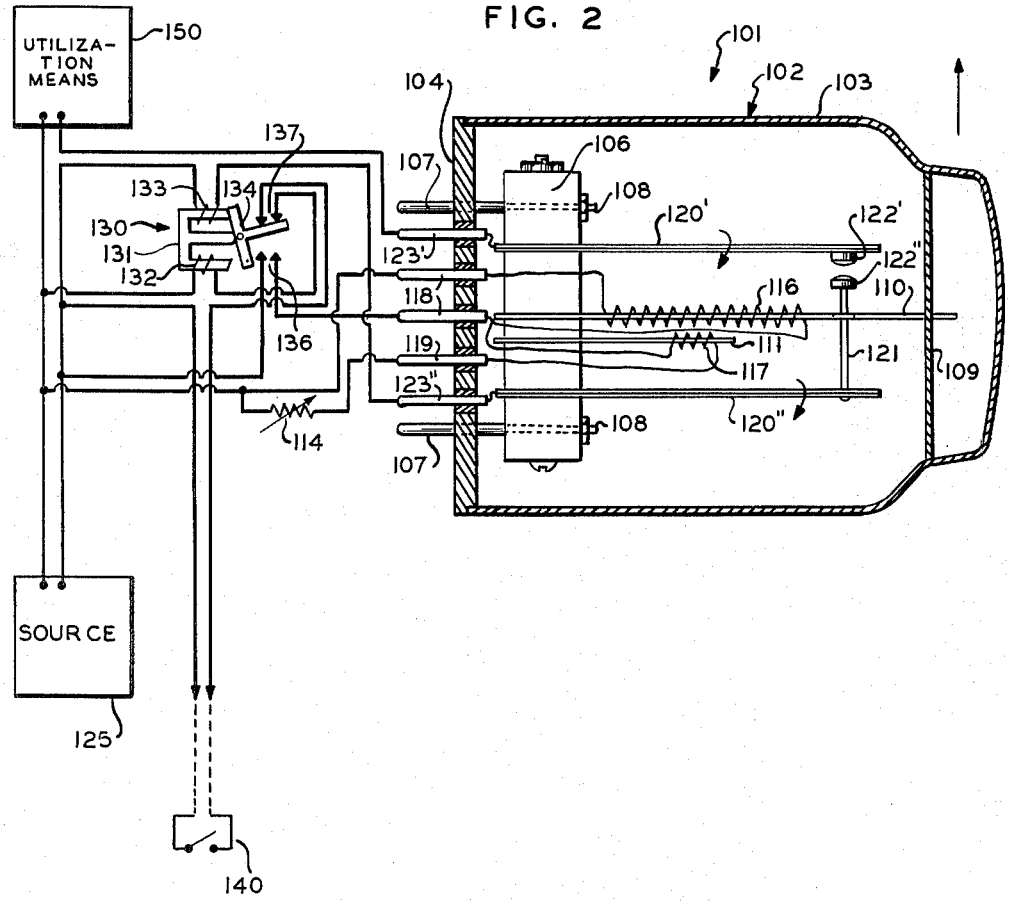

3,241,374
SENSING OF ACCELERATION
Murray I. Menkis, West Orange, N.J., assignor to G-V Controls Inc., Livingston, N.J., a corporation of New Jersey
Filed July 13, 1962, Ser. No. 209,652
3 Claims. (Cl. 73—503)

This invention relates to the sensing of acceleration. It contemplates such sensing not only in the context of measuring acceleration, but also in the context of indicating the arrival of acceleration at a preselected value, and in the further context of measuring the time integral of acceleration or indicating the arrival of that integral at a preselected value.

The technique of the invention involves convection current within a body of fluid, such as a gas, enclosed within and extending throughout an enclosure. Such a current is the result of intra-fluid forces developed within the fluid body.

Briefly to explain the intra-fluid forces insofar as they exist along a vertical direction, attention is invited to any miniature or elemental horizontally and vertically faced cube of the fluid, of arbitrarily chosen side dimension $b$ and of density $S$, located at any arbitrary position within the fluid body. Reckoning directions upwardly by using a positive sign to denote upwardness and a negative sign to denote downwardness, there will be some pressure $+P_1$ exerted on the cube by the underlying fluid acting against its bottom face and some pressure $-P_2$ exerted on it by the overlying fluid acting against its top face; there will also be exerted on it a gravitational force of $-b^3Sg$, whose equivalent pressure (i.e., the same force expressed in terms of pressure on one horizontal face of the cube) is $-bSg$. If the enclosure and the fluid as a body be stationary then the sum of the three pressures is zero, from which it obviously follows that $$P_1 - P_2 = bSg$$

More generically, to cover as well the case wherein the enclosure and fluid are actually experiencing an acceleration along a vertical direction of $a$ (upwardly reckoned) so that a dynamic force $b^3Sa$ and thus an equivalent pressure $bSa$ is being thereby exerted on the cube, the sum of the three pressures above dealt with is equal to that dynamic equivalent pressure $bSa$—or in other words $P_1 - P_2 = bS(g+a)$.

This states that the net vertical intra-fluid force on the elemental portion of the liquid is proportional both to fluid density and to the sum of gravity and any acceleration (upwardly reckoned) which the enclosure and fluid as a body may actually be experiencing. In the unique case wherein the enclosure and the fluid body are actually undergoing negative or downward acceleration precisely equal to gravity—e.g., if they are in a state of perfect free fall—$g+a$ equals zero and there can be no intra-fluid force on the elemental portions. Otherwise such a force necessarily exists as to each elemental portion within the fluid body. This does not yet necessarily mean, however, that there will be a convection current; indeed, if the body be at uniform temperature throughout then identical intra-fluid forces will be exerted on all the elemental portions at any one level, and those forces will be only minutely less (due to minutely reducing density) at each succeeding higher level, the result being perfect equilibrium of and an absence of any convection current within the fluid body.

But, again excepting the perfect-free-fall case, if the temperature of a local fixed region within the fluid body (i.e., fixed relative to the container) be different from that or those of other regions within that body, the immediate result will be a difference of the density of the elemental portions of fluid situated there from the density or densities of the elemental portions situated in those other regions. The in-turn induced result is an upset of the equilibrium and the establishment of significant differences of intra-fluid forces, in response to which there is set up a flow of fluid from region to region.

If for example a heater be installed and operated at a local region fixed within the container, the elemental portions of fluid in its immediate vicinity will be heated, their densities will be thereby reduced, and the upwardly reckoned intra-fluid forces on them will in turn be reduced; the intra-fluid forces on the elemental portions at other regions, not having been correspondingly reduced in density, will "pinch" or float the heated portions upwardly. Those fluid portions which replace the original pinched-up portions will themselves become heated and pinched up and in turn replaced—and so on in a continuous process obviously resulting in a sustained current first passing upwardly from the local region of origin (i.e., that of the heater) and then circulating in a more or less diffuse loop (depending on the geometry of the enclosure) back to that region. Obviously if the local region of origin were the region of a cooler (rather than of a heater) there would result a sustained current of corresponding nature excepting that its direction would be downward (rather than upward) from the region of origin.

Such a current is a convection current. In any given system it is of course affected by molecular friction within the particular fluid body, and by the geometry of the container and of the region of origin. Being a function of the intra-fluid forces on the elemental portions, it is responsive to the differences in temperature between the region of origin and the remaining regions within the enclosure. Most significantly, it is responsive to the sum of gravity and any acceleration (upwardly reckoned) which the enclosure and the fluid body may actually be experiencing.

Based on the phenomena outlined above it has previously been proposed to utilize convection currents to detect deviations from verticality of an axis. To accomplish this two filaments, each enclosed in either a respective or in a common gas-filled space, have been arranged to form the top arms of a Y of which it may be considered that the central bottom arm is the axis of interest; an electric current has been passed serially through the two and an electrical observation made, as by a null-bridge circuit, of the magnitude and sign of the difference between the voltage drops across each. Assuming negligible accelerating influence other than gravity, then so long as the angles of inclination of the respective filaments are equal, the rates of loss of heat from the two by convection are equal and those voltage drops are therefore equal; when those angles become unequal by reason of a shift of the axis from verticality, however, the rate of loss from one of the filaments increases and that from the other decreases, the former becoming cooler and of decreased resistance and voltage drop and the latter hotter and of increased resistance and voltage drop. It has also been observed that if the components be in process of actual vertical acceleration at the same time that the axis is off-vertical, the magnitude of the voltage difference becomes a function of the resultant of that acceleration and gravity, the device being to that extent an accelerometer. The phenomena and the application thereof outlined above appear to have been thought of in terms of the convection currents leaving the origin along a vertical line—i.e., along the line of influence of gravity and of vertical actual acceleration—upwardly or downwardly as the case may be.

I have observed, however, that with a simple fluid-filled enclosure having therewithin a single region of origin in the form of a local heater or cooler, one may select—quite without regard to verticality—any origin-traversing line fixed relative to the enclosure, and that then the convection current away from the origin along that line is responsive to and thus an indication of the sum of (1) the actual acceleration along that line (taken in an arbitrarily chosen "forward" direction) which the enclosure and fluid body may be experiencing, and (2) that component of gravity, if any, which exists along that line (taken in the reverse or "rearward" direction). Accordingly in an important aspect the present invention contemplates the establishment of an origin-traversing line within and fixed relative to such an enclosure, and the sensing of the convection flow away from the origin in the forward direction along that line.

The result is a sensing of the sum of (a) the actual acceleration which the enclosure and fluid are undergoing in the forward direction along that line, and (b) the component of gravity which exists in the rearward direction along that line. In certain useful ranges and/or applications (b) is inherently negligible compared to (a) and may be ignored, so that the system as thus simply described may with small error be considered as sensing simply (a); in those ranges and/or applications wherein (b) is relatively more substantial it may be independently known or determined by other means and readily applied as a correction to the sensing effected by the system, so as to render the net result more precisely a sensing simply of (a).

The enclosure may for example be fixed in a vehicle or missile so that the established line coincides or is parallel with the axis of the vehicle or missile along which the latter is to be accelerated and preferably so that the forward direction along that line is that in which the movement of the vehicle or missile will take place. The enclosure and its contents being of utmost simplicity and requiring relatively simple associated circuitry, it will be appreciated that there is thus provided for the vehicle or missile an acceleration-sensing system of extreme simplicity and ruggedness relative to the elaborate and delicately adjusted mechanical systems conventionally used for the sensing of acceleration—especially when the system must operate without any ground reference and without reliance on the characteristics or state of the atmosphere through which the vehicle or device may be moving.

In preferred embodiments of the invention I employ a single region of origin (rather than two or more) and an absolute (rather than a comparative) mode of sensing the convection current from that region along the established line; this results in maximum, rather than minimum or zero, sensitivity of the device as an accelerometer with respect to accelerations along that line. From another point of view, instead of employing the negative technique of sensing the losses by convection from a heat source, I employ the positive technique of sensing the accretion of convection-transferred heat by a heat-receiving element.

In certain of the embodiments the sensing is deliberately accomplished in the first instance with respect to the time integral of acceleration, rather than with respect to acceleration itself, so that the device then directly performs a function with respect to velocity. With those embodiments which do not in the first instance integrate, the output in electrical form may be passed to suitable simple integrating means for the performance of a similar function when that is desired.

It is an object of the invention to provide a simple, rugged and relatively inexpensive device and associated circuitry for sensing acceleration. It is an object to provide such a device and circuity which are free of any need for coupling to an external reference (such as ground or surrounding atmosphere) and which therefore may be usefully employed in such free-moving objects as aircraft or missiles.

It is an object to provide such a device and associated circuitry which are readily adapted for integration of their output so that they may serve various further purposes such as the sensing of velocity or velocity change. It is an object to provide such a device and circuitry in which the integration is inherently achieved within the device.

Allied and other objects have been made apparent above or will appear from the following description and the appended claims.

In the detailed description of my invention hereinafter set forth reference is had to the accompanying drawings, in which:

FIGURE 1 is a view showing in cross section a device according to the invention, showing schematically typical associated circuitry, and (below the line X—X) showing in perspective cross section a further typical device and (schematically) associated circuitry by which the gravitational component discussed above may be determined for application as a correction to the sensing accomplished by the basic device and circuitry; and FIGURE 2 is a view showing in cross section a modified device according to the invention and showing schematically typical associated circuitry.

Reference being had to FIGURE 1, there will be seen a typical device 1 according to the invention. This may comprise a hermetically sealed elongated enclosure 2 formed for example by a cylinder 3 and mutually similar cup-shaped end caps 4' and 4" sealed to its respective ends. The end caps may be centrally provided with respective hermetic seals 5' and 5" through which may pass and in which may be secured respective pairs 6' and 6" of metallic pins and also third metallic pins 7' and 7".

Within the enclosure 2 and coaxial therewith there may be provided an elongated tubular member 10, which may for example be longitudinally approximately coextensive with the cylinder 3; a sufficient number of radially arranged posts 9 between it and that cylinder may for example hold it securely in its described position. The tubular member 10 may desirably comprise two metallic end sections 11' and 11" each terminating a substantial distance away from the longitudinal center, sleeves 12' and 12" of heat-insulating material surrounding and extending centerwardly from the centerward rims of the respective end sections, and a metallic central section 13 extending from the centerward mouth of sleeve 12' to that of sleeve 12". Along a diameter of the central section 13 and thus of the tubular member 10, at their longitudinal center, there may extend a small heater 16 for example of coil form, whose terminals 17 may extend through and be sealed in suitable insulating bushings 14 which are in turn sealed in the central section 13. One of the terminals 17 may be connected as by a flexible conductor 18' to the pin 7' and the other as by flexible conductor 18" to the pin 7". At its ends the member 10 is preferably flared down to a reduced diameter, as indicated at 10' and 10".

The several portions of the tubular member 10 may be secured one to another for example by heat-resistant cement. The metallic central section 13 is preferably of as thin a wall as is consistent with mechanical strength in order to minimize its heat capacity, and is preferably of poor-absorbing and -radiating metal such as aluminum.

The pins 6' may support a small bead thermistor 20' whose terminal conductors may be secured to those pins, and correspondingly the pins 6" may support an essentially identical small bead thermistor 20". Each thermistor is desirably located at a respective mouth of the tubular member 10; by suitable proportionings of the parts and lengths of the pins 6' and 6" this may readily be done while at the same time keeping very short, for mechanical stability, the lengths of the terminal conductors of the thermistors.

The enclosure 2 may contain a filling of gas (which term is used in a broad sense, to include mixtures as well as single gases) at a suitable pressure. I have found dry air at ordinary atmospheric pressure to provide a suitable filling, but no unexpressed limitation thereto is intended.

The device 1, thus described, will be mounted in the object of which, and with its axis coinciding with the line along which, acceleration is to be sensed; ordinarily this line will be one coinciding with the line of motion of the object, at least during periods of sensing. For convenience in the further description these coincidences, absent any statement to the contrary, will be assumed; it will similarly be assumed that along that line the direction of the motion will be as indicated by the arrow in FIGURE 1 (which points away from the "rear" cap 4″ toward "forward" cap 4′), acceleration being positive when the velocity of that motion is increasing and negative when such velocity is decreasing.

Externally of the device the pins 7′ and 7″ may be connected across any suitable source 15 for energization of the heater 16. The pins 6′ and thus the thermistor 20′ may be connected across a fixed resistor 21′, while pins 6″ and thus the thermistor 20″ may be connected across a fixed resistor 21″. In series with 20′-21′ may be connected a resistor 22′, while in series with 20″-21″ may be connected a resistor 22″. The orders of magnitude of resistance of the two resistors thus associated with each of the thermistors are preferably so chosen as to render substantially linear, within the range of temperatures which the thermistors will experience, the variation with thermistor temperature of the ratio $$\frac{(r_{20}+r_{21})r_{22}}{r_{20}r_{21}+(r_{20}+r_{21})r_{22}}$$

wherein $r_{20}$, $r_{21}$ and $r_{22}$ respectively denote the resistance of the thermistor, the resistance of 21′ or 21″, and the resistance of 22′ or 22″. The two circuits 20′-21′-22′ and 20″-21″-22″ may be connected to form a bridge 23 whose energization terminals lie at the junctions of 21′ with 21″ and of 22′ with 22″, and whose output terminals lie at the junctions of 21′ with 22′ and of 21″ with 22″. An energizating source 25 may be connected across those energization terminals; those output terminals may be connected, for example through conductors 27 and double-pole multi-throw switch 29, to a suitable indicating device 30, preferably of zero-center scale variety. In the conductors 27 there may if desired be interposed an amplifier 28 for the amplification of the bridge output to any desired degree before its application to the indicating device 30. The bridge will of course be appropriately balanced so that when the two thermistors are at the same temperature the indicating device 30 will read zero.

A structure which for many applications is useful without more has thus been described, and attention may therefore next be devoted to its operation.

Let it first be assumed that the device is stationary, with its axis horizontal. From the heater to the tubular member 10 there will take place some transfer of heat by radiation and some transfer by conduction (through 17 and 14) and some transfer by convection currents, all of these transfers affecting principally the central section 13; in turn from the tubular member 10 to the enclosure 2 there will take place some transfers of heat by radiation and convection and some transfer by conduction (through 9); and in turn heat will be transferred in various manners away from the exterior of the enclosure 2. For a while after initiation of heater energization these various transfers will progressively alter, but they will eventually stabilize and a balance will then be reached and thereafter maintained between the temperatures of all the portions of the device including the thermistors.

In these transfers each thermistor will experience some heating but, especially in view of the heat-insulating sleeves 12′ and 12″ in the tubular member, that heating will be of very modest degree. Still more importantly, whether or not the ultimate balance of temperatures has yet been fully reached, the heating of the two thermistors will be essentially uniform in view of the essential symmetry of the device about its longitudinal midpoint—and in view of the horizontal disposition of the device assumed for immediate discussion, which locates the thermistors at the same level and thus precludes any unidirectional convection flow through the tubular member as well as any other dissimilarity of gravity-produced convection effects on the two thermistors. Thus they are at a uniform temperature, and there is no output from the bridge and no indication by the indicating device 30.

Let it next be assumed that the device is still stationary but with its axis reoriented to vertical, forward end (i.e., cap member 4′) up. The heat transfers other than by convection will not be appreciably changed, but the convection transfers will be. The disposition of the thermistors at the mouths of the tubular member 10 results in an essential confinement, of the effects of the changed convection transfers on the thermistors, to the effect of that convection current which now passes unidirectionally upwardly through the tubular member 10, from 10″ to 10′—but that effect is very substantial. It causes the now-top thermistor 20′ to be heated much more than when the device was horizontal, and much more than the now-bottom thermistor 20″. The resulting unbalance of the bridge in turn results in substantial output from the bridge and a substantial indication by the indicating device 30. This indication will have been produced by gravity, which of course has a value of 1 $g$, acting in a downward—now rearward—direction on the gas within the device.

Let it next be assumed that the axis is again horizontal but that now the device is experiencing an actual forward acceleration of 1 $g$. Gravity will now tend to produce essentially the same convection currents as in the stationary-and-horizontal case, above seen to result in zero indicator reading; the actual forward acceleration will now tend to produce essentially the same convection currents, including the forward unidirectional current through the tubular member, as gravity produced in the stationary-and-vertical case. The actual pattern of convection currents within the device will be a resultant of those separate patterns—but since the effect on relative thermistor temperature separately exerted by the former is zero, the effect exerted by the resultant will be approximately the same as the effect separately exerted by the latter pattern. Thus there will be produced an indicator reading approximately the same as in the stationary-and-vertical case.

Perfect identity of the readings in these last two cases may be slightly interfered with by alteration of the losses from and thus of the temperature of the heater; such alteration is, however, minimized by a structure, such as that described above, wherein the central section 13 of the tubular member 10 is characterized by very low heat capacity and poor heat-absorption and -radiation characteristics and wherein it is heat-insulated (as by sleeves 12′ and 12″) from the end sections of that member. In general the calibration of the apparatus—by which is meant the fixing as by a potentiometer 26 of the amplitude of bridge energization and/or the adjustment of the degree of amplification effected by 28 if employed, as well as the placement of indicia on the scale of the indicating device 30—at the 1–$g$ level is preferably done for full accuracy under the conditions of the last case, or in other words with an actual forward 1–$g$ acceleration of the device while horizontal.

It will readily be understood that any other magnitude of forward acceleration of the horizontal device will produce a result qualitatively similar, but differing quantatatively in the magnitude of the forwardly directed convection current through the tubular member 10—and therefore in the temperature difference between the thermistors and in turn in the bridge output and the indicator reading. The magnitude of that current will vary essentially linearly with the forward acceleration, the temperature difference between the thermistors will vary almost linearly with that current, and the bridge output (with choices of relative resistance values as discussed above) may be made relatively close to linear with the thermistor temperature difference; thus the indicator reading may be made to vary in a fairly-nearly linear manner with the forward acceleration. The proper positions for all the forward-acceleration scale indicia may of course readily be determined by suitable prototype tests under dynamic conditions.

There is no limitation of the device and system to forward accelerations; it is equally useful in the sensing of rearward acceleration—which of course includes the important case of negative acceleration (i.e., deceleration) of forwardly directed motion. This inherently follows from the symmetry of the device about its longitudinal center. Acceleration in the rearward direction in effect simply reverses the behaviors of the two thermistors, resulting in a bridge output of absolute magnitude identical with that produced by an equal forward acceleration—but reversed in direction, so that the reading of the indicator will be in the opposite direction, to which a zero-center scale is ideally appropriate.

It may here be mentioned that when there is a unidirectional convection flow through the tubular member 10 there will necessarily be a corresponding net return flow distributed through the space between that member and the cylinder 3, and that (unless the axis be vertical) the distribution of this return flow will be quite unsymmetrical about the axis. If also the device itself were substantially non-symmetrical about the axis, there would exist the possibility of its behavior varying appreciably with its angular position about the axis. The essential symmetry of the device 1 about the axis forecloses this undesirable possibility; it follows that its angular position about the axis may vary, either at random or progressively (as it would if it or the object in which it is coaxially mounted were discharged from a rifled bore), without effect on its output indications.

The foregoing outline of operation (other than the portion dealing with vertical axis, which is therein included as an aid to the subsequent portions) has dealt only with horizontal axis, motion and acceleration. While this represents a particular set of conditions, it is a very commonly encountered set, and it follows that the device and associated circuitry as thus far described—which have been seen to function accurately in the strictly horizontal case and may be shown to function with very small error in the almost-horizontal case—has, without more, a substantial field of utility.

Before turning to the inclined-axis case there may be mentioned certain typical alternatives which are available in connection with the apparatus already described. Thus while the source 25 may be a D.C. source, the amplifier 28 (if employed) a D.C. amplifier and the indicator 30 one actuated by D.C., all three may if preferred be A.C. devices. When the source (and amplifier if employed) are D.C. devices there may be substituted for the two-terminal indicator 30 (as by throw of the poles of switch 29 upwardly one contact each) a ratiometer 32, to the third and fourth terminals of which D.C. from the source 25—regulated by potentiometer 26 if employed and, if an amplifier 28 be employed in the conductors 27, amplified by an amplifier 28a effecting identical amplification—is applied; the use of the ratiometer has the advantage of avoiding the necessity for insuring constancy of the potential of the source 25.

The indicator 30 (or ratiometer 32) is of course of an instantaneous-value-reading type, which indicates the magnitude of acceleration as it exists from moment to moment. In another aspect it may be desired to read, instead of that moment-to-moment value, the time integral of the acceleration, or change in velocity from some reference instant. For this alternative purpose there may be substituted for the indicator 30 (as by throw of switch 29 downwardly one contact) the combination of an integrating network 33, normally shorted as by a switch 34 which may be opened at the reference instant, and a suitable output indicator 36 therefor. It will of course be understood that if the switch 34 be opened at or before the start of the motion, then the change in velocity indicated by 36 at any time will be the change from zero—i.e., will be the then-attained velocity itself.

In still another aspect, there may be shunted across the indicator 30 as by switch 31, or across the indicator 36 as by switch 37, the coil of a relay 38 which by suitable means (not shown) is adjusted to operate (e.g., to close) its contacts 39 when the acceleration indicated by 30 or the time integral of acceleration indicated by 36 arrives at a preselected value. (At least for shunting across 30, which yields positive and negative readings, this relay may be a polarized one to insure uniqueness of the algebraic value at which it will operate.) The relay contacts 39 may of course be connected in any desired circuit, for any desired purpose. For specific purposes when the relay 38 is used it may be permissible to eliminate the indicator across which it is herein shown to be shunted.

Attention may now be directed to the case wherein the axis of the device is inclined away from horizontal by some angle $\phi$—for convenience in analysis, first assuming the device stationary. The difference of this case from the horizontal-axis case of course lies in the fact that the parallel lines along which gravity acts on the gas within the device are no longer at right angles, but instead are inclined at the angle $\phi$, with respect to the axis. Gravity with its magnitude of 1 $g$ may, however, be resolved into any one of an infinite number of pairs of components at right angles to each other—i.e., into $g \sin \theta + g \cos \theta$, wherein $\theta$ is any angle—and this resolution will be a useful one provided each of the resulting components represents a gravitational influence having a discrete effect on those convection currents which are significant (i.e., which influence the output readings). The tubular member 10 is a means which restricts the significant convection currents to essentially that single one which flows internally of the tubular member and thus axially of the device; this sole significant current is, in the stationary condition of the device, essentially proportionate to $g \sin \phi$, while the significant current which would be proportionate to $g \cos \phi$ has been rendered zero. The tubular member thus renders discrete the effects of $g \sin \phi$ and of $g \cos \phi$, and makes useful the resolution of $g$ into those two components—which respectively are the component of gravity acting rearwardly along the axis, and the component of gravity at right angles to the axis.

Accordingly while the axis is inclined at the angle $\phi$ and the device remains stationary the reading of the indicator 30 or 32 will be $g$ multiplied by the positive or negative fraction which constitutes $\sin \phi$—$\phi$ being considered positive when the forward end of the device is higher, and negative when that forward end is lower, than the read end.

If now while the axis is inclined at the angle $\phi$ the device moves along that axis and in the movement experiences either positive or negative acceleration, the reading of the indicator 30 or 32 under these dynamic conditions will be the algebraic sum of that actual acceleration and $g \sin \phi$ (i.e., the quantity which was or would have been indicated by the static-condition reading described in the preceding paragraph). This dynamic reading therefore requires the algebraic subtraction of $g \sin \phi$ in order to yield the actual acceleration of the device. Stated in other terms, in order to arrive at the actual acceleration the absolute value of $g \sin \phi$ must be subtracted from or added to the dynamic reading, according to whether the forward end of the device is higher or lower than the rear end.

So long as $g \sin \phi$ is very small compared to the dynamic reading—whether because it is itself small, or because the actual acceleration is large, or because of each of those situations at least partially obtaining—little error is entailed in neglecting it. But when $g \sin \phi$ is not very small compared to the dynamic reading, accuracy is obtained only by determining and appropriately applying the value of $g \sin \phi$ as a correction to the dynamic reading above outlined. In one of its aspects the invention contemplates that the value of $g \sin \phi$ will be determined under the dynamic conditions and used as such a correction.

For determining the absolute value of $g \sin \phi$ a particular means, of which various specific features are not themselves part of the present invention, has been illustrated below the line X—X in FIGURE 1.

This means comprises a device 41 and associated circuitry; for simplicity of description various details of the device, such as those of the mountings of its components and the like, are not elaborated either in the drawing or in the description. Briefly, the device may comprise a hermetically sealed enclosure 42 formed for example by a cylinder 43 short compared to its diameter, a rear end member 44 and a front end member (not shown). Mounted in any convenient manner within the device are two elongated tubular members 45 and 46 each extending along a respective diameter of the cylinder 43, those diameters being at right angles to each other but displaced from each other longitudinally of the cylinder 43 sufficiently so that the tubular members may be discrete ones; the lengths of the tubular members are equal and substantially shorter than the diameters of the cylinder 43 and centered within that cylinder. At their ends the tubular members may be flared down to reduced diameters. Centrally within the tubular members may be provided respective small heating coils 47 and 48. At the mouths of the tubular member 45 may be positioned respective small bead thermistors 49' and 49", while at the mouths of the tubular member 46 may be positioned respective small bead thermistors 50' and 50", all four thermistors being mutually similar. The enclosure 42 may contain a filling of gas, for example dry air at ordinary atmospheric pressure. The device 41 will be mounted with its axis A—A (i.e., that of cylinder 43) coinciding or parallel with the axis of the device 1 above described, and thus ordinarily coinciding with the line of motion of the object in which both devices are mounted; if that object spins appreciably about its axis, it is desirable that the axes of it and of the device 41 coincide. The heaters 47 and 48 may be connected in parallel with each other internally of the device, and externally connected for energization across any suitable source, for example the source 15 mentioned above.

Externally of the device the thermistor 49' may be connected across a fixed resistor 51', while the thermistor 49" may be connected across a fixed resistor 51". In series with 49'–51' may be connected a resistor 53', while in series with 49"–51" may be connected a resistor 53"; the orders of magnitude of resistance of these resistors may be chosen for substantial linearity of the ratio of any voltage across 53' (or 53") to that across 49'–51'–53' (or 49"–51"–53"), analogously to the choice discussed above in connection with the device 1. The two circuits 49'–51'–53' and 49"–51"–53" may be connected to form a bridge 55 whose energization terminals lie at the junctions of 51' with 51" and of 53' with 53", and whose output terminals lie at the junctions of 51' with 53' and of 51" with 53". Quite correspondingly, resistors 52' and 54' may be associated with the thermistor 50', and resistors 52" and 54" with the thermistor 50", and their respective circuits connected to form a corresponding bridge 56.

For the energization of the bridges 55 and 56 there is employed an A.C. source 60 of any convenient frequency—purely by way of example, 400 c.p.s. The output voltage from this source is split into two output voltages of similar magnitudes but displaced 90° in phase from each other—for example, by application across a series circuit formed by a resistor 61 and a capacitor 62 which at the frequency of the source has a reactance equal to the resistance of 61. The voltage from across resistor 61 is applied to the energization terminals of bridge 55, and the voltage from across capacitor 62 to the energization terminals of bridge 56—one of these applications, e.g. that of the voltage from across 61, being through a suitable 1:1 isolation transformer such as 63. The output terminals of the two bridges are connected in series and across common output conductors 67, through which and double-pole double-throw switch 69 the cumulative bridge output is applied to an indicator 70; an amplifier 68 may if desired be interposed in the conductors 67.

The heaters 47 and 48 being energized, the bridges having been balanced, and provided proper sequences of arrangement and polarities of connection have been observed, it may be shown: (1) that the cumulative bridge output across conductors 67 will be wholly independent of accelerations along the axis A—A of the device 41, (2) that that output will be of a magnitude wholly independent of the angular position of the device 41 about its axis (which angular position influences only the phase relationship between that output and the source 60), (3) that that output will be at a maximum when the axis A—A of the device is horizontal, and (4) that that output will decrease, as the axis A—A is inclined from horizontal, in essential proportionality with the cosine of the angle—$\phi$—of deviation of the axis from horizontal.

The indicator 70 may be provided with a scale appropriately calibrated in cosine values; if then by suitable adjustment of the amplification effected by 68 (if employed) or of the voltage from source 60 (as by a potentiometer 59 provided for the purpose) the reading of the indicator 70 with the axis horizontal be made unity, that reading at any inclination $\phi$ of the axis will be $\cos \phi$—whatever may be the angular position of the device 41 about the axis. Obviously the scale may be calibrated in terms of $\phi$ itself or of $\sin \phi$; equally well it may be calibrated in terms of $g \sin \phi$—and then from it may be read directly the correction required to be applied to the reading of the indicator 30 or 32.

There are known converters or systems which act to derive, from a voltage having an amplitude representing the cosine of an angle, a voltage having an amplitude representing the sine of that angle, and such a system is diagrammatically indicated as 71 in FIGURE 1. By throw of the switch 69 the cosine-representing output from the conductors 67 may be applied to the converter 71, from which the sine-representing output may be rectified as by diode 72, smoothed as by capacitor 73 and applied by conductors 74 across a switch 77 serially interposed in one of the conductors 27 and hitherto assumed to have been closed. With the switch 77 open, the rectified output of the converter 71 will be superimposed on the D.C. voltage otherwise being supplied through the switch 29 to one or another of the indicating devices. A polarity-reversing switch 75 may be included in the conductors 74; if this switch be thrown to the proper polarity (determined by which end of the device 1 is at the higher elevation) and if the relative source voltages and amplifications (if employed) in the two parts of the system be properly interrelated, the correction required to be applied to the uncorrected reading of the indicator 30 or 32 will be made electrically, rendering the reading of that indicator a net or corrected one. At least over a period of time during which the ascendency of one over the other end of the device 1 does not reverse, this procedure is also available for the automatic correction of the readings of the integrating indicator system 33–36. It is equally applicable to the uses of the relay 38 described above—which is of particular importance in those uses since they otherwise admit only of some predetermined correction.

It will be understood that in the system of FIGURE 1 the thermistor (20' or 20") toward which a unidirectional convection flow within the tubular member 10 is at any time directed is a heat receiver whose temperature (reflected by the bridge–23 output) is a function of, among other things, the rate at which it receives heat from that flow, while the other thermistor is then a compensating heat receiver whose function is to cancel out (from the bridge–23 output) the effect of various forms of heat transfer to the first receiver other than by that flow. It will also be understood that in the use of the system the bridge–23 output (and in turn the indications or measurements derived therefrom) is an analogue of the rate of heat reception by the heat receiver; further, that the output of the bridges 55–56 (and in turn the indications or measurements derived therefrom) is an analogue of that component of gravity which exists rearwardly along the axis—a second analogue which may be combined with the first analogue to reflect the actual acceleration along the axis.

With respect to the device 1 it is to be understood that no unexpressed limitation of its heat-receiving means to thermistors is intended, it being obvious that other heat-receiving means may be substituted therefor. Thus for example the thermistors 20' and 20", and with them the bridge 23 and its source 25, might be replaced by two mutually similar thermocouples mechanically positioned as are those thermistors and electrically connected across conductors 27 in series opposition to each other (i.e. so that when at the same temperature they yield a composite output voltage of zero).

Obviously the heater 16 is broadly a local generator of temperature difference, another form of which would be a local cooler—and were that to be used the heater-receiving means 20'–20" would operate to receive heat in its negative, rather than positive, form.

The heat-receiving means described up to this point have been of low—preferably very low—mass and thermal inertia, with the result that in the simple case the sensing by the system is a sensing, with very small time lag, of the moment-to-moment values of the acceleration; in the particular case wherein a sensing of the time integral of acceleration is to be achieved the integration has been accomplished by supplementary means such as 33. According to another aspect of the invention, however, the basic device itself may be arranged to accomplish an integration, so that the sensing will in the first instance be a sensing of the time integral of acceleration. This aspect is illustrated in FIGURE 2, in which a substantially modified device proper appears as 101; this device by way of example is one which, instead of providing an output reading of the time integral as it exists from moment to moment, itself indicates the arrival of that integral at a preselected value. These distinctions of the device 101 from the device 1 previously described make possible external circuitry of great simplicity—particularly if, as is contemplated for the system of FIGURE 2, the system is to be used under such circumstances that the correction for the effect of gravity may either be ignored or calculated and suitably allowed for in advance.

The device 101 may comprise an enclosure 102 formed for example by a header 104 and a deep cup-shaped member 103 into the mouth of which the header is hermetically sealed. Interiorly of the enclosure and close to the header 104 may be an insulating stack 106; this may for example be mounted on threaded rods 108 forming inward extensions of a pair of pins 107 secured in the header. Clamped in the stack 106 at about the diametrical center of the device and extending inwardly from the stack may be a thin card 110 of mica or other insulating material; the far end of this card may engage a suitable aperture in a disc 109 which is fitted transversely within the member 103 in a reduced-diameter end portion of the latter and serves to provide a second support for the card. On the card 110 is wound a heater 116.

In the stack 106 at some distance in one direction (e.g., upwardly) from the card 110 may be clamped the end portion of a bimetallic element 120' which from that end portion extends generally parallel to the card almost to the disc 109. In the stack at a distance from the card in the opposite direction (e.g., downwardly) from the card may be clamped the end portion of a second bimetallic element 120" which extends generally parallel and otherwise similarly to the element 120'. The elements 120' and 120" may be mutually similar and arranged to deflect in similar directions (e.g., downwardly) with increase of their temperatures. The element 120', on its surface facing 120", may carry a contact 122'; the element 120", on its surface facing 120', may carry a post 121 which passes through a suitable oversized aperture in the card 110 and terminates in a contact 122" adjacent to but normally (i.e., when 120' and 120" are at the same temperature) somewhat spaced from the contact 122'. The contacts 122' and 122" may be electrically connected to header-traversing pins 123' and 123", for example through the intermediaries of elements 120' and 120" respectively.

The heater 116 may be electrically connected to the header-traversing pins 118. The device 101 may be filled with any suitable gas, such as dry air at ordinary atmospheric pressure.

Externally of the device 101 the pins 118 may be arranged for electrical connection across an energizing source 125. When they are so connected the heater 116 will be energized and heat will be transferred therefrom to the bimetallic elements 120' and 120" by radiation (and to a slight extent by conduction through 110 and 106). Best to insure uniformity of such transfers to 120' and 120" it may be desirable deliberately to make the transfer to one of them (e.g., 120") a little less than that to the other by establishing its spacing from the heater at a slightly greater value, and then controllably to increase it to equality with the transfer to the other; this may for example be done by clamping in the stack 106 slightly below the card 110 an auxiliary shorter card 111 on which is wound a small auxiliary heater 117, by connecting one terminal of the auxiliary heater to one of the pins 118, and by connecting the other terminal of the auxiliary heater to a header-traversing pin 119 which is externally connected to the other of the pins 118 through an adjustable resistor 114. By suitable adjustment of resistor 114 the radiation (and conduction) transfers of heat from 116 and 117 collectively to 120' and 120" may be quite closely equalized. Insofar then as such transfers are concerned the spacing between contacts 122' and 122" will be negligibly affected by the energization of the heaters.

Over and above those heat transfers, however, there will of course take place away from the heaters a significant flow of heat by convection. Let it be assumed that the resultant convection-producing influence of actual motional acceleration and of gravity be an upward one, as indicated by the arrow in FIGURE 2. Then the convection flow will be upward from the heater 116 to the bimetallic element 120' (and from 117 around 116 to the region of 120') and from that element 120' in some diffuse return path, ultimately back to the region of the heaters; the element 120' will be heated to a much greater extent than the element 120", the magnitude of the excess being essentially proportionate to that of the resultant influence mentioned above. The element 120' will accordingly deflect more than the element 120", and the contacts 122'–122" will ultimately be closed. By reason of the substantial heat capacity of each of the elements 120' and 120" the deflection of each, and likewise the excess of the deflection of the former over that of the latter, will be essentially proportionate to the integral of the resultant influence mentioned above; accordingly the contacts 122'-122" will close when that time integral has arrived at a value preselected by the magnitude of the normal spacing of the contacts, and this closure will be an indication of the arrival of the time integral at the preselected value.

In the device 101 there is provided no means for rendering discrete the actual-acceleration and gravity components of the resultant influence; if gravity be of a substantial magnitude relative to the actual acceleration and act at a substantial angle thereto, the convection flow away from the heaters will take place principally along an oblique plane not necessarily intersecting the element 120'. This tends to limit the usefulness of the device of FIGURE 2 to those cases wherein gravity either is small relative to actual acceleration or acts along a line forming no more than a modest angle with the line along which actual acceleration takes place, or both; for many purposes, however, this limitation is not a hurtful one.

The integrating function of the device 101 of course takes place with reference to the instant at which the energization of the heaters is commenced, and such commencement may of course be effected by closure of any suitable switch interposed between the heater and the source 125. There are circumstances of possible use of the system (such as for the actuation of some function when the velocity of a rocket or other missile first reaches a preselected value after take-off) wherein it may be desirable to effect this switch closure by a momentary electrical impulse only (applied for example from a stationary ground control just at the instant of take-off). With such circumstances in mind FIGURE 2 illustrates the abovementioned switch as formed by two contacts 136 of a magnetic latch relay 130, which is provided with another pair of contacts 137 and which operates in response to a suitably applied momentary impulse to close that pair of contacts which was previously open and to open that pair which was previously closed. Such a relay may for example comprise an E-shaped core 131, coils 132 and 133 respectively wound on the two outer legs of the core, and a T-shaped armature 134 having its arm intersection pivoted adjacent the free end of the center leg of the core; upon energization of coil 132 the armature is rocked to open contacts 137 and to close contacts 136, while upon energization of coil 133 the armature is rocked to open contacts 136 and to close contacts 137. Coil 132 may for example be connected to form a series circuit with contacts 137 and with an external switch 140 and that circuit may be connected across the source 125; coil 133 may be connected to form a series circuit with pins 123' and 123" (and thus with contacts 122'-122") and with a utilization means 150 which is to be energized when contacts 122'-122" close, and that circuit may be connected across the same source 125. All the apparatus other than the switch 140 may be mounted in the rocket or missile, the elements 120'-120" being aligned with each other (as shown) in the upward direction in which the rocket or missile will move on take-off. Preparatorily the relay 130 will have been placed in the condition wherein its contacts 136 are open and its contacts 137 closed (that closure of 137 having at that time no operative effect in view of the then-open condition of switch 140).

As an incident to the effecting of take-off the stationary switch 140 will be closed (whether permanently or momentarily is of no significance). Its closure will energize coil 132, rocking the armature away from its illustrated position to open contacts 137 and to close contacts 136—the latter action initiating the energization of the heaters and thus the start of the integration. When the sum of the velocity, or time integral of acceleration, of the rocket or missile and the component of gravity which exists rearwardly along the line of travel has reached the value for which the spacing of contacts 122'-122" was set, those contacts will close—thereby not merely energizing coil 133 (and thereby rocking the armature to the illustrated position, opening contacts 136 and thereby stopping the energization of the heaters, and incidentally re-closing contacts 137) but also accomplishing the basically important function of energizing the utilization means, which of course may have any function desired to be performed at the velocity initially mentioned.

It will be understood that in the system of FIGURE 2 the bimetallic element (120' or 120") toward which a convection flow from the heater is at any time directed is a heat receiver which integrates with respect to time the rate at which it receives heat, which receives and integrates heat from that flow, and whose temperature (reflected by its deflection) is a function of, among other things, the resulting integral—or, alternatively stated, is a heat receiver which accumulates its received heat, which receives and accumulates heat from the flow mentioned above, and whose temperature is a function among other things of that accumulation—while the other bimetallic element is then a compensating integrating heat receiver whose function is to cancel out, from the differential between the deflections of the two heat receivers, the effects of various forms of heat transfer to the first other than by the flow mentioned above.

With either of the embodiments of the invention it is contemplated that the associated circuitry will ordinarily be mounted in the movable body to which the device proper (1 or 101) is mounted and whose acceleration is to be sensed. In cases wherein the intelligence rendered available by the system is desired at a point remote from that body, it may be abstracted from the associated circuitry and transmitted to that point by suitable techniques which, being themselves known, are not herein necessary to disclose.

While I have disclosed my invention in terms of particular embodiments thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. A system for sensing acceleration comprising an enclosure; elements within the enclosure including a filling of fluid, a local heater, a pair of heat receivers, said heat receivers being spaced away from the heater substantially similarly but in opposite directions in a line along which an acceleration of the enclosure may have a component, thereby to render distinct their respective receptions of heat transferred from the heater by convection while rendering substantially similar their respective receptions of heat otherwise transferred from the heater, and tubular means surrounding the heater and extending therefrom substantially as far as each of said heat receivers for causing heat flowing from the heater by convection, when the enclosure is subject to an acceleration having a component along said line, to arrive at one or the other of said heat receivers; and output means coupled to said heat receivers and responsive to the difference between their temperatures.

2. In an acceleration-sensing device, the combination of an enclosure and therewithin a filling of fluid, an open-ended tubular member spaced away from the wall of the enclosure, a local heater positioned within a central portion of the tubular member, a pair of heat-sensitive electrical devices located at the respective ends of the tubular member, each end of said tubular member being sufficiently constricted to concentrate at the respective electrical device convection flow through that end, and an external circuit in which said electrical devices are connected.

3. The subject matter claimed in claim 2 wherein the central portion of said tubular member is of low thermal capacity and is thermally isolated from the more endward portions of that member.

References Cited by the Examiner

UNITED STATES PATENTS

| | | | |
|---|---|---|---|
| 2,440,189 | 4/1948 | Zworykin | 33—206.5 |
| 2,455,394 | 12/1948 | Webber | 73—514 |
| 2,554,512 | 5/1951 | Varian | 73—516 |
| 2,613,071 | 10/1952 | Hansel | 73—503 |
| 2,716,214 | 8/1955 | Wing | 336—30 |
| 2,942,864 | 6/1960 | Sikora | 73—505 |

FOREIGN PATENTS

| | | |
|---|---|---|
| 582,246 | 11/1946 | Great Britain. |
| 646,025 | 11/1950 | Great Britain. |

RICHARD C. QUEISSER, *Primary Examiner.*

ROBERT L. EVANS, JAMES J. GILL, *Examiners.*